2,889,331

MANUFACTURE OF N-ALKYL- AND N-CYCLO-ALKYLBIS(2-BENZOTHIAZOLESULFEN) AMIDES

Norman K. Sundholm, Naugatuck, Conn., assignor to United States Rubber Company, New York, N.Y., a corporation of New Jersey No Drawing. Application September 28, 1956
Serial No. 612,573

4 Claims. (Cl. 260—306.6)

This invention relates to a method for the preparation of N-alkyl- and N-cycloalkylbis(2-benzothiazolesulfen) amides. These compounds are useful as accelerators for the vulcanization of rubber or other vulcanizable rubber-like substances. Further, they have the useful property of showing good resistance to scorch, that is, they have little tendency to cause incipient vulcanization of conventional rubber stocks during processing.

These compounds can be prepared by the reaction of 2-benzothiazolesulfenyl chloride with the appropriate primary amine in the presence of a suitable base according to the equation

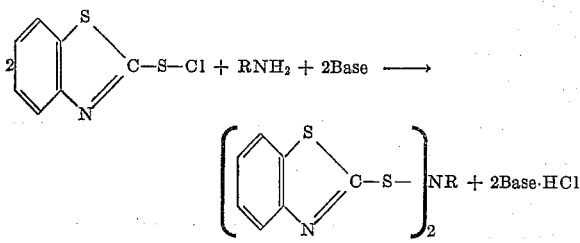

R in the above equation is a member of the group consisting of alkyl and cycloalkyl radicals.

The quality of the products obtained by the application of this reaction varies considerably with the base used and the conditions under which the reaction is carried out. When aqueous sodium hydroxide or an aliphatic tertiary amine is used as the base and the reaction carried out by adding a solution of 2-benzothiazolesulfenyl chloride in a suitable solvent to the mixture of primary amine and base, the products are quite impure.

When sufficient primary amine is used it can serve as the base in the reaction; the equation then becomes

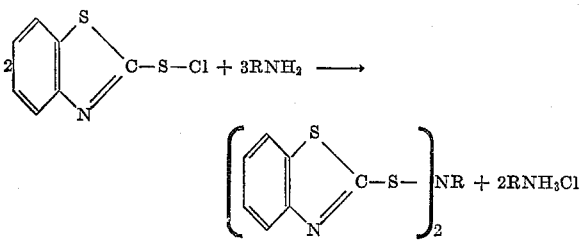

It has been found that this reaction is extremely sensitive to the conditions used. Variations in the reaction temperature, the order of mixing of the reactants, the mixing time, etc., have effect on the amounts of undesirable by-products, such as benzothiazolyl disulfide, formed. The presence of the by-products results in a decrease in the scorch resistance of the materials obtained and lessens their usefulness as delayed action accelerators.

The purpose of this invention is to provide conditions for carrying out this reaction so as to give the bis(2-benzothiazolesulfen) amides with minimum contamination by other products.

It has now been discovered that good quality N-alkyl- and N-cycloalkylbis(2-benzothiazolesulfen) amides can be prepared by the progressive addition of the corresponding monalkyl- or monocycloalkylamine to 2-benzothiazolesulfenyl chloride in approximately a 3:2 molar ratio, respectively, at a temperature in the range from about −40 to about 0° C.

The 2-benzothiazolesulfenyl chloride may be used as a solution or suspension in a suitable organic liquid; the sulfenyl chloride can be formed by the chlorination of a suspension of benzothiazolyl disulfide in the liquid according to W. E. Messer, U.S. Patent No. 2,257,974, dated October 7, 1941. Examples of organic liquids which may be used are n-hexane, methylene chloride, ethylene chloride, carbon tetrachloride, benzene, toluene, and chlorobenzene.

The primary amines, whether they are gases, liquids, or solids under ordinary conditions, may be used as such or in solution in a suitable organic liquid. This liquid preferably should be the same as that used in the preparation of the sulfenyl chloride, since its recovery in commercial operation would be expedient.

A series of experiments in which isopropylamine is added to the sulfenyl chloride during approximately a two-hour addition time using reaction temperatures of −30, −20, −10, 0, 10, and 25° C. has shown that the quality of the N-isopropylbis(2-benzothiazolesulfen) amide obtained at the temperatures below 0° C. is good, at 0° C. it is borderline, and at the temperatures above 0° C. it is unsatisfactory. Using other primary amines at a reaction temperature of −20 C. and an addition time of approximately two hours gives good quality products. Two tests which have been used to determine the quality of the products in a rough manner are the melting point test and the Mooney scorch test.

It has been observed that a mixture of a bis(2-benzothiazolesulfen) amide and greater than about five percent of benzothiazolyl disulfide melt over a range which extends above the melting point of the pure amide. The greater the proportion of the disulfide, the higher the clearing point of the mixture. All pure N-alkyl- and N-cycloalkylbis(2-benzothiazolesulfen) amides prepared have melting points below that of the disulfide.

In the well-known Mooney scorch test as run on the Mooney viscometer the more scorch resistance exhibited by an accelerator incorporated into a rubber stock, the longer the scorch time of the stock. Contamination of the accelerator with one or more accelerators having less scorch resistance results in a reduction of the scorch time of the stock. On the basis of the scorch times of the rubber stocks containing as accelerators the products obtained demonstrating the usefulness of the low temperature method, a comparison of their quality can be made.

The following examples are presented to illustrate this invention.

*Example 1.—Preparation of N-isopropylbis(2-benzothiazolesulfen)amide*

A solution of 2-benzothiazolesulfenyl chloride was prepared by the treatment of a stirred suspension of 66.4 grams of benzothiazolyl disulfide in 500 ml. of anhydrous ethylene chloride with 14.2 grams of chlorine. A solution of 35.4 grams of isopropylamine in 100 ml. of anhydrous ethylene chloride was added to the stirred sulfenyl chloride solution at −11 to −9° C. during a two-hour period. After completion of the addition, stirring was continued for one-half hour at −11 to −9° C. and then the temperature permitted to rise to room temperature. The mixture was filtered and the isopropylamine hydrochloride washed with two 100-ml. portions of ethylene chloride. The wash was added to the filtrate and the ethylene chloride removed. The product consisted of 75.7 grams (97% of theory) of pale pink solid melting at 97–101° C.

When pure this compound melts at 106–107° C. Ligroin (B.P. 60–90° C.) can be used as a recrystalization solvent for the bis(2-benzothiazolesulfen)amides.

The procedure was repeated using reaction temperatures as follows (the melting ranges of the products are given in parentheses): 25° C., (65–152° C.), 10° C. (90–142° C.), 0° C. (95–126° C.), −20° C. (97–102° C.), and −30° C. (99–107° C.).

*Example 2.—Preparation of N-cyclohexylbis(2-benzothiazolesulfen)amide*

The procedure was the same as that used in Example 1 substituting 59.4 grams of cyclohexylamine for the isopropylamine and using a reaction temperature of −21 to −19° C. The product consisted of 84 grams (98% of theory) of pale pink solid melting at 123–128° C. When pure this compound melts at 133–134° C.

*Example 3.—Preparation of N-methylbis(2-benzothiazolesulfen)amide*

The procedure was the same as that used in Example 1 substituting 18.6 grams of methylamine for the isopropylamine and adding it as a gas below the surface of the solution of sulfenyl chloride at −21 to −19° C. The product consisted of 70.7 grams (98% of theory) of tan solid melting at 97–102° C. When pure this compound melts at 110° C.

*Example 4.—Preparation of N-ethylbis(2-benzothiazolesulfen)amide.*

The procedure was the same as that used in Example 1 substituting 27 grams of ethylamine for the isopropylamine and adding it as a gas below the surface of the solution of sulfenyl chloride at −21 to −19° C. The product consisted of 70.8 grams (94% of theory) of pale pink solid melting at 87–91° C. When pure this compound melts at 92° C.

These products and the purified bis(2-benzothiazolesulfen)amides were tested for scorch resistance on the Mooney viscometer at 250° F. in the following formula:

|  | Parts by weight |
|---|---|
| Smoked sheet | 100 |
| Furnace black | 45 |
| Zinc oxide | 5 |
| Zinc salts of cocoanut oil acids | 3.5 |
| Pine tar | 3.5 |
| Antioxidant | 2.0 |
| Sulfur | 2.25 |
| Accelerator | 0.5 |

On the basis of the scorch times of the stocks, the products were rated for percent of scorch resistance as related to the corresponding pure bis(2-benzothiazolesulfen)amide. These ratings are given in the following table.

| Example | Reaction temperature (° C.) | Rating (percent) |
|---|---|---|
| 1 | 25 | 67 |
| 1 | 10 | 76 |
| 1 | 0 | 87 |
| 1 | −10 | 99 |
| 1 | −20 | 99 |
| 1 | −30 | 98 |
| 2 | −20 | 96 |
| 3 | −20 | 92 |
| 4 | −20 | 95 |

These data show that the quality of the bis(2-benzothiazolesulfen)amides obtained at the reaction temperatures below 0° C. is good, at 0° C. it is borderline, and at the temperatures above 0° C. it is unsatisfactory. The quality of the products as demonstrated by their melting ranges agrees with the quality shown by the scorch resistance rating. The melting ranges of the products obtained above 0° C. are exceptionally broad, while the melting ranges of the products obtained below 0° C. are relatively narrow.

Having thus described my invention, what I claim and desire to protect by Letters Patent is:

1. A method of preparing a member of the group consisting of N-alkyl- and N-cycloalkylbis(2-benzothiazolesulfen)amides which comprises the progressive addition of the corresponding amine to 2-benzothiazolesulfenyl chloride in approximately a 3:2 molar ratio, respectively, at a temperature in the range from about −40 to about 0° C.

2. A method as set forth in claim 1 in which the amine is monomethylamine.

3. A method as set forth in claim 1 in which the amine is monoisopropylamine.

4. A method as set forth in claim 1 in which the amine is monocyclohexylamine.

References Cited in the file of this patent

UNITED STATES PATENTS

| | | |
|---|---|---|
| 2,321,305 | Messer | June 8, 1943 |
| 2,343,538 | Ebelke | Mar. 7, 1944 |
| 2,370,253 | Messer | Feb. 27, 1945 |

OTHER REFERENCES

Carr et al.: J. Org. Chem., vol. 14, pp. 921–2 (1949).